United States Patent
Oishi

(10) Patent No.: US 10,776,055 B1
(45) Date of Patent: Sep. 15, 2020

(54) MANAGEMENT APPARATUS AND NON-TRANSITORY COMPUTER READABLE MEDIUM OF DISTRIBUTING INFORMATION RELATED TO CHARGING INCURRED FOR PRINTING

(71) Applicant: FUJI XEROX CO., LTD., Tokyo (JP)

(72) Inventor: Tadahiro Oishi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/535,044

(22) Filed: Aug. 7, 2019

(30) Foreign Application Priority Data

Feb. 27, 2019 (JP) .................................. 2019-033851

(51) Int. Cl.
| | |
|---|---|
| *G06F 15/00* | (2006.01) |
| *G06F 3/12* | (2006.01) |
| *G06K 15/00* | (2006.01) |
| *G06Q 30/04* | (2012.01) |
| *H04L 29/08* | (2006.01) |

(52) U.S. Cl.
CPC .......... *G06F 3/1204* (2013.01); *G06F 3/1268* (2013.01); *G06Q 30/04* (2013.01); *H04L 67/10* (2013.01)

(58) Field of Classification Search
CPC ..... G06F 3/1204; G06F 3/1268; G06Q 30/04; H04L 67/10
USPC ............................... 358/1.15, 1.1, 1.13, 1.14
See application file for complete search history.

(56) References Cited

U.S. PATENT DOCUMENTS

| | | | |
|---|---|---|---|
| 6,987,580 B2* | 1/2006 | Watanabe | H04M 3/5322 358/1.15 |
| 2010/0067034 A1* | 3/2010 | Minamizono | G06F 3/1297 358/1.13 |

FOREIGN PATENT DOCUMENTS

JP    2016146137    8/2016

* cited by examiner

*Primary Examiner* — Douglas Q Tran
(74) *Attorney, Agent, or Firm* — JCIPRNET

(57) ABSTRACT

A management apparatus includes a first receiving unit that receives a document and a notification destination that are transmitted from a reservation apparatus, an assigning unit that assigns reservation identification information to the document received by the first receiving unit, a memory that stores the document, the reservation identification information, and the notification destination, a second receiving unit that receives charging information from an image processing apparatus, the charging information being information related to charging incurred for printing of a document corresponding to the reservation identification information, and a first transmitting unit that transmits, to a charging management infrastructure, the charging information, and the notification destination stored in the memory.

8 Claims, 16 Drawing Sheets

FIG. 4

| RESERVATION REQUEST ID (410) | DOCUMENT (420) | NOTIFICATION DESTINATION (430) |
|---|---|---|
| YY0001 | 20181119.pdf | xxx@ffffxxxxx.co.jp |

| RESERVATION ID (510) | RESERVATION IDENTIFICATION INFORMATION (520) | DOCUMENT (530) | NOTIFICATION DESTINATION (540) |
|---|---|---|---|
| Y0001 | 2PXZM40K | 20181119.pdf | xxx@ffffxxxxx.co.jp |
| Y0002 | N51BS7D2 | photo.jpg | hoge@gmmmm.com |

| REQUEST REPLY ID (610) | RESERVATION REQUEST ID (620) | RESERVATION IDENTIFICATION INFORMATION (630) |
|---|---|---|
| YH0001 | YY0001 | 2PXZM40K |

| 710 | 720 |
|---|---|
| DOCUMENT PRINT REQUEST ID | RESERVATION IDENTIFICATION INFORMATION |
| BY0001 | 2PXZM40K |

| 810 | 820 | 830 |
|---|---|---|
| DOCUMENT PRINT INSTRUCTION ID | DOCUMENT PRINT REQUEST ID | DOCUMENT |
| BS0001 | BY0001 | 20181119.pdf |

| 910 | 920 | 930 | 940 | 950 |
|---|---|---|---|---|
| PRINT REPORT ID | DOCUMENT PRINT INSTRUCTION ID | DATE/TIME PRINTED | PRINTED DOCUMENT NAME | PRINTING CHARGE |
| IF0001 | BS0001 | 20181201 | 20181119 | 500 YEN |

| PRINT COMPLETION ID | PRINTING CHARGE | NOTIFICATION DESTINATION |
|---|---|---|
| IK0001 | 500 YEN | xxx@ffffxxxxx.co.jp |

| CHARGING ID | NOTIFICATION DESTINATION DOMAIN | CHARGING MANAGEMENT APPARATUS ADDRESS |
|---|---|---|
| KK0001 | ffffxxxxx.co.jp | 211.152.98.xxx |
| KK0002 | OTHER THAN ABOVE | 158.211.36.xxx |

| CHARGING INSTRUCTION ID | PRINTING CHARGE | NOTIFICATION DESTINATION |
|---|---|---|
| KS0001 | 500 YEN | xxx@ffffxxxxx.co.jp |

1210, 1220, 1230, 1200

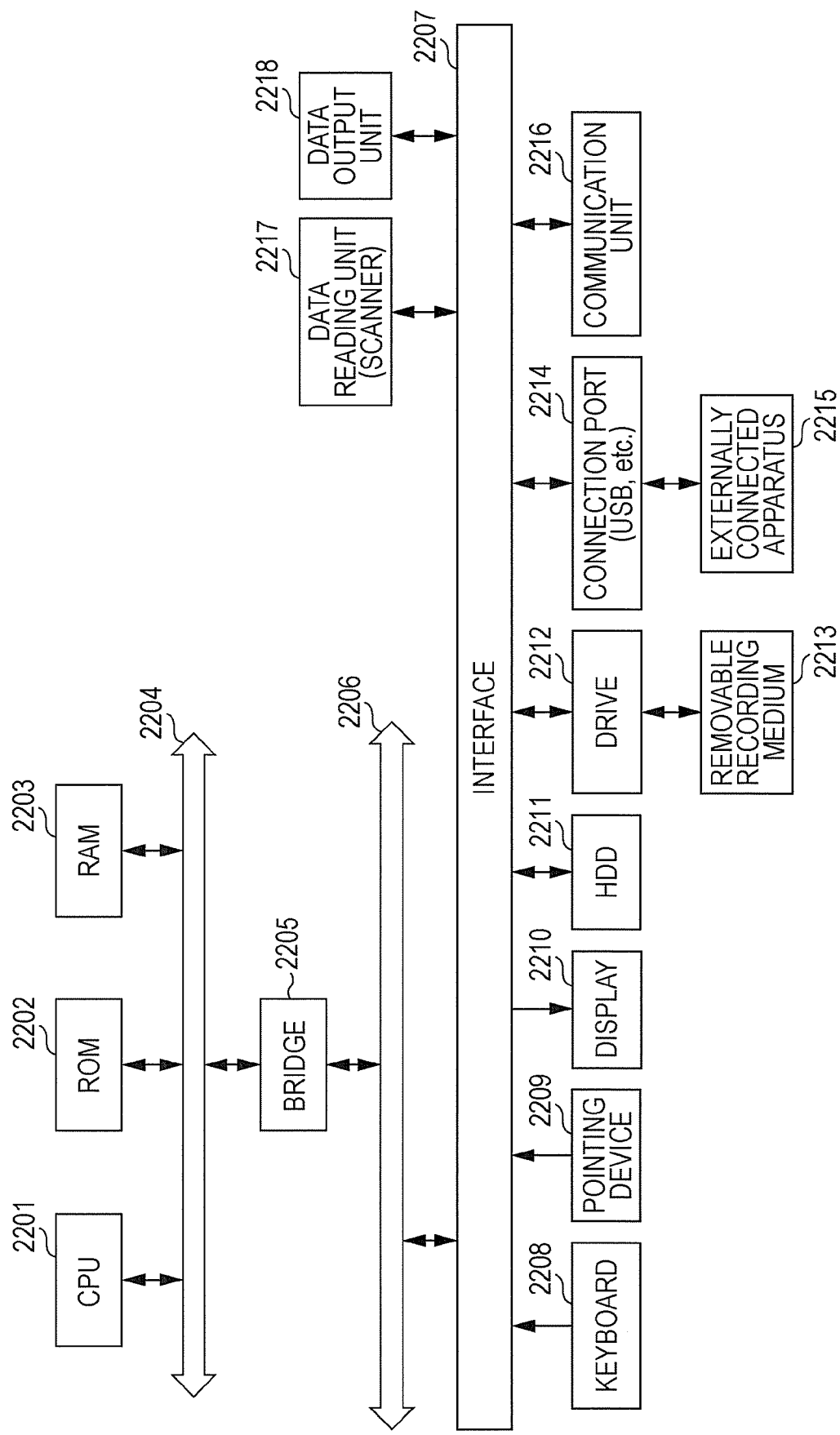

MANAGEMENT APPARATUS AND NON-TRANSITORY COMPUTER READABLE MEDIUM OF DISTRIBUTING INFORMATION RELATED TO CHARGING INCURRED FOR PRINTING

CROSS-REFERENCE TO RELATED APPLICATIONS

This application is based on and claims priority under 35 USC 119 from Japanese Patent Application No. 2019-033851 filed Feb. 27, 2019.

BACKGROUND

(i) Technical Field

The present disclosure relates to a management apparatus and a non-transitory computer readable medium.

(ii) Related Art

Japanese Unexamined Patent Application Publication No. 2016-146137 discloses a technique described below. This technique aims to make it possible to reflect, on a charging management apparatus internal to an organization, charges related to use of an image processing apparatus external to the organization by a user internal to the organization. According to this technique, when a user wants to have a document belonging to his or her organization printed by a public printer that is under the control of a public printing server, the user requests an internal printing server of the organization for reservation of printing. The internal printing server presents the user with charging destination candidates corresponding to the user, accepts a selection of a charging destination from among the presented candidates, and transmits a usage reservation request containing information on the selected charging destination to the public printing server. In response to the usage reservation request, the public printing server issues a reservation ID, and holds the reservation ID in association with the charging destination information. When the document is printed on the public printer by the user presenting the reservation ID, the public printing server transmits, to the internal printing server, information on the charging destination and information on the amount of charge that correspond to the reservation ID. The internal printing server instructs a charging management system to charge the amount to the charging destination.

In printing a document reserved by an operator acting in a given capacity, in order to distribute information related to charging incurred for the printing to a billing destination, it is necessary for the user to explicitly specify the billing destination.

SUMMARY

Aspects of non-limiting embodiments of the present disclosure relate to a management apparatus, a non-transitory computer readable medium, and an information processing system that make it possible to, in printing a document reserved by an operator, distribute information related to charging incurred for the printing to a charging destination, without the operator having to explicitly specify the charging destination.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a management apparatus including a first receiving unit that receives a document and a notification destination that are transmitted from a reservation apparatus, an assigning unit that assigns reservation identification information to the document received by the first receiving unit, a memory that stores the document, the reservation identification information, and the notification destination, a second receiving unit that receives charging information from an image processing apparatus, the charging information being information related to charging incurred for printing of a document corresponding to the reservation identification information, and a first transmitting unit that transmits, to a charging management infrastructure, the charging information, and the notification destination stored in the memory.

BRIEF DESCRIPTION OF THE DRAWINGS

Exemplary embodiment of the present disclosure will be described in detail based on the following figures, wherein:

FIG. 4 illustrates an exemplary data structure of a usage reservation information table;

FIG. 5 illustrates an exemplary data structure of a registration management table;

FIG. 6 illustrates an exemplary data structure of a usage reservation response information table;

FIG. 7 illustrates an exemplary data structure of a print request information table;

FIG. 8 illustrates an exemplary data structure of a print instruction information table;

FIG. 9 illustrates an exemplary data structure of a print completion report information table;

FIG. 10 illustrates an exemplary data structure of a print completion information table;

FIG. 11 illustrates an exemplary data structure of a charging domain management table;

FIG. 12 illustrates an exemplary data structure of a charging information table;

FIG. 22 is a block diagram illustrating an exemplary hardware configuration of a computer for implementing the exemplary embodiment.

DETAILED DESCRIPTION

An exemplary embodiment of the present disclosure will be described below with reference to the drawings.

Figure 1:
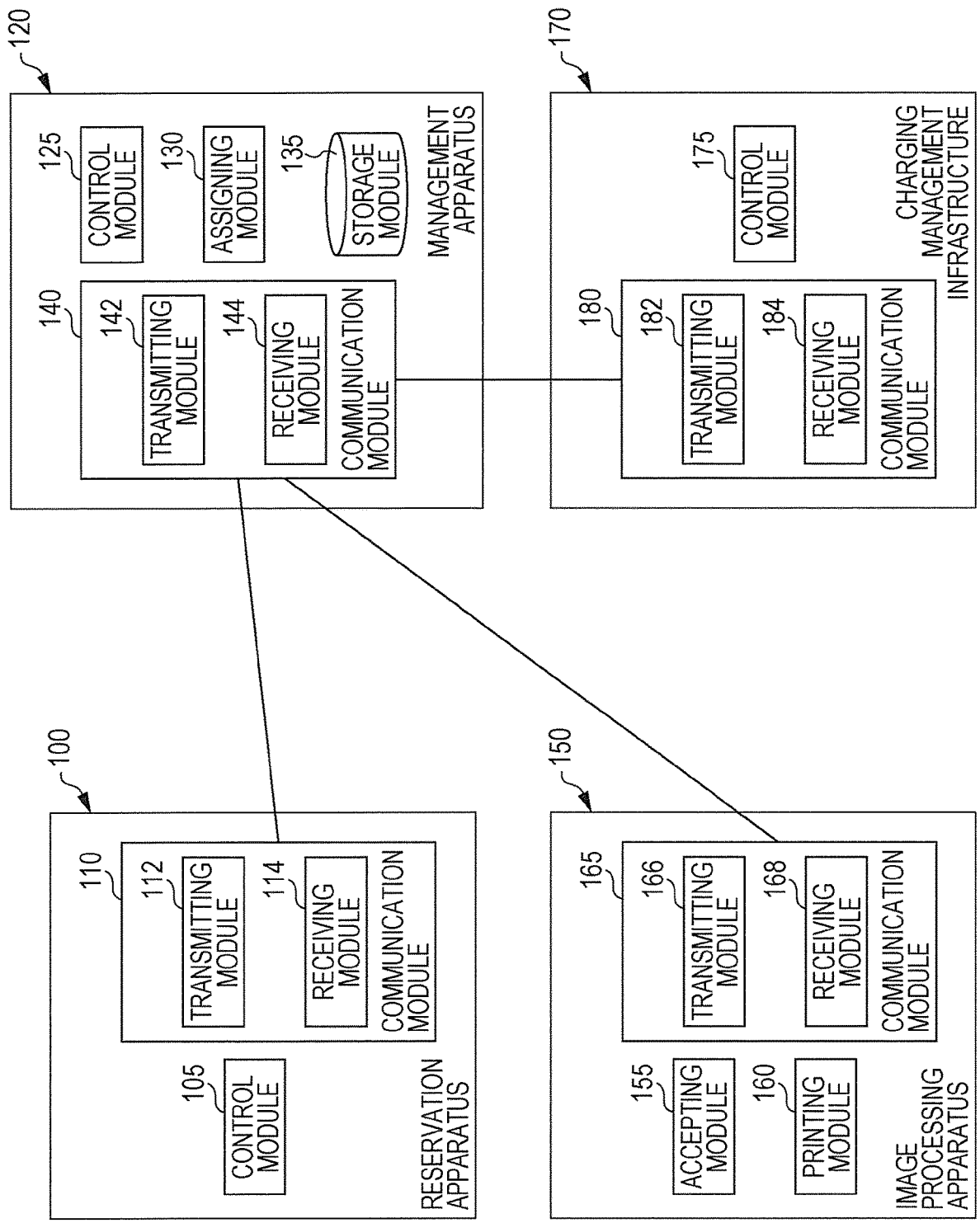
FIG. 1 is a conceptual module diagram of an exemplary configuration according to the exemplary embodiment.

FIG. 1 is a conceptual module diagram of an exemplary configuration according to the exemplary embodiment.

The term module generally refers to a logically separable component such as software ("software" is herein interpreted to include a computer program) or hardware. Accordingly, the term "module" as used in the exemplary embodiment refers to not only a module in the context of computer programs but also a module in the context of hardware configurations. Therefore, the exemplary embodiment will be also described in the context of a computer program for providing functions of such modules (e.g., a program causing a computer to execute individual procedures, a program causing a computer to function as individual units, or a program causing a computer to implement individual functions), a system, and a method. Although "store", "be stored", and equivalent expressions are used herein for the convenience of description, these expressions mean, when the exemplary embodiment relates to a computer program, "cause a memory to store" or "control a memory so as to store". Although individual modules and functions may have a one-to-one correspondence, in actual implementation, a single module may be implemented by a single program, or multiple modules may be implemented by a single program. Conversely, a single module may be implemented by multiple programs. Further, multiple modules may be executed by a single computer, or a single module may be executed by multiple computers that are in a distributed or parallel environment. A single module may include another module. In the following description, the term "connection" refers to not only a physical connection but also a logical connection (e.g., exchanging of data, issuing of an instruction, cross-reference between data items, or log-in). The term "predetermined" as used herein means being determined prior to a process of interest, which not only means being determined before processing according to the exemplary embodiment begins but also being determined, even after the processing according to the exemplary embodiment begins, at any point in time preceding a process of interest in accordance with the condition/state at that point in time, or in accordance with the condition/state up to that point in time. If multiple "predetermined values" exist, each of these values may be different, or two or more of these values (the term "two or more of these values" is meant to include, of course, all of these values) may be the same. Further, expressions that have the meaning of "if "A" holds, then "B" is performed" is used to mean that "it is determined if "A" holds, and then "B" is performed if it is determined that "A" holds", unless it is not necessary to determine if "A" holds. When items are listed in the form "A, B, C", for example, such a list is intended to be illustrative only unless otherwise specified and includes cases where only one (e.g., only "A") of the listed items is selected.

Furthermore, the term "system", or "apparatus" or "device" includes not only cases where a system, or an apparatus or device is made up of multiple components, such as computers, hardware components, or apparatuses that are connected to each other via a communication medium such as a network (the term "network" includes a one-to-one communication setup), but also cases where a system, or an apparatus or device is implemented by a single component such as a computer, a hardware component, or an apparatus or device. The terms "apparatus" or "device", and "system" are herein used synonymously. As a matter of course, the term "system" does not include what is merely a social "mechanism" (i.e., a social system), which is a man-made arrangement of rules.

Further, for each process executed by each module or, if multiple processes are to be executed within a module, for each of the multiple processes, information of interest is read from a memory, and after execution of the corresponding process, the results of processing are written into the memory. Accordingly, reading of information to the memory before execution of a process, and writing of information to the memory after execution of the process may not be described in some cases. The term "memory" as used herein may include a hard disk drive, a random access memory (RAM), an external storage medium, a memory using a communication line, and a register within a central processing unit (CPU).

An information processing system according to the exemplary embodiment has the capability to register a document in advance, print the registered document, and transmit information related to charging incurred for the printing to a charging management apparatus 280 suited for handling such information. As illustrated in the example of FIG. 1, the information processing system includes a reservation apparatus 100, a management apparatus 120, an image processing apparatus 150, and a charging management infrastructure 170. There may be multiple reservation apparatuses 100, multiple management apparatuses 120, multiple image processing apparatuses 150, and multiple charging management infrastructures 170. For example, there may be one reservation apparatus 100 for each operator, and one image processing apparatus 150 for each store.

A case is now considered where, in printing a document reserved by an operator, the operator associates reservation identification information with information about a billing destination in order to distribute information related to charging incurred for the printing to the billing destination. Setting charging destination information for every reservation identification information is, however, cumbersome. Such a process is also potentially error-prone. Further, for a case where authentication information specific to each organization to which the operator belongs is used in allowing use of the image processing apparatus, if the operator is a freelancer who does not belong to any organization in the first place, then the operator has to go through the whole process beginning with the registration of authentication information, and the registration itself is also a cumbersome procedure.

The information processing system according to the exemplary embodiment makes it possible to, in printing a document reserved by the operator, distribute information related to charging incurred for the printing to a billing destination without the operator having to associate reservation identification information or authentication information with the billing destination.

In the exemplary embodiment, the operator uses a different notification destination for each different billing destination. If, for instance, the operator belongs to multiple companies as in the case of a dual job or a side job, if charging is to be billed to Company A, the operator uses Notification Destination A used by Company A, and if charging is to be billed to Company B, the operator uses Notification Destination B used by Company B. This corresponds to, for example, a case where Notification Destination A is an email address assigned by Company A, and Notification Destination B is an email address assigned by Company B.

The reservation apparatus 100 includes a control module 105, and a communication module 110. The reservation apparatus 100 is operated by the operator. In accordance with an operator's operation, the reservation apparatus 100 registers, into the management apparatus 120, a document that will be printed by the image processing apparatus 150 in the future. Of course, examples of such documents include those called electronic files or files.

The control module 105 controls modules internal to the reservation apparatus 100.

The communication module 110 includes a transmitting module 112, and a receiving module 114. The communication module 110 is connected to a communication module 140 of the management apparatus 120 via a communication line. The communication module 110 communicates with the management apparatus 120.

The transmitting module 112 transmits the following pieces of information to the management apparatus 120 that manages the image processing apparatus 150: a document to be printed; and a notification destination used to receive reservation identification information for the document.

The term "document to be printed" as used herein refers to a document that will be printed by the image processing apparatus 150 in the future. The image processing apparatus 150 may not necessarily be determined at the time when the document is transmitted to the management apparatus 120. The operator may freely select any image processing apparatus 150 capable of communicating with the management apparatus 120.

The term "reservation identification information" may refer to any information that makes it possible to uniquely identify a document registered in the management apparatus 120 in accordance with the exemplary embodiment. This information is entered on the image processing apparatus 150 when the operator prints the document.

The term "notification destination" refers to a destination to which to send reservation identification information. This information allows the operator of the reservation apparatus 100 to be identified. Examples of notification destination may include the email address of the operator, and an address used in a SNS's messaging function.

The receiving module 114 receives reservation identification information transmitted to a notification destination from the management apparatus 120. By entering the reservation identification information on the image processing apparatus 150, a document registered in the management apparatus 120 can be printed. Reservation identification information may be stored by the operator. Alternatively, reservation identification information may be stored into the reservation apparatus 100 in advance, and transmitted from the reservation apparatus 100 to the image processing apparatus 150 through short-range wireless communication between the reservation apparatus 100 and the image processing apparatus 150. Examples of such short-range wireless communication may include Near Field Communication (NFC) technologies.

Further, the receiving module 114 may receive reservation identification information transmitted to a notification destination from the management apparatus 120, and information indicative of the charging management apparatus 280 corresponding to the notification destination.

The control module 105 may be made to confirm with the operator whether to transmit charging information, which is information related to charging incurred for document printing, to the charging management apparatus 280 indicated by the information received by the receiving module 114.

This is because determining the charging destination based on the notification destination alone may result in selection of a charging destination not intended by the operator. Accordingly, in order to avoid this, the control module 105 provides a user interface that "confirms with the user whether to transmit charging information to the charging management apparatus 280 corresponding to a notification destination". Details of this process will be described later with reference to examples illustrated in FIGS. 18 to 20.

The reservation apparatus 100 may be made to store "notification destinations of reservation identification information" previously specified by the operator, such that when making a reservation for the second time onward, the user is allowed to select from among the previously stored notification destinations. In this regard, notification destinations, which are typically email addresses, SNS addresses, or other such information, are hard to remember and also cumbersome to enter. Accordingly, if, as in the case of Web applications or mobile applications, the reservation apparatus 100 has a mechanism to retain information that has been entered once by the user, the user may be allowed to select from multiple choices for the second time onward.

The reservation apparatus 100 may be allowed to, for management purposes, assign an alias name to each specified "notification destination of reservation identification information" and display the assigned alias name. Examples of such alias names may include those called labels. While email addresses, SNS addresses, or other such information are herein assumed as notification destinations, giving a label such as "Work" or "Small Business Owner" to each notification destination helps increase the accuracy of "specifying the notification destination of reservation identification information in accordance with the capacity in which to use the image processing apparatus 150".

The management apparatus 120 includes a control module 125, an assigning module 130, a storage module 135, and the communication module 140. The management apparatus 120 stores a document reserved by using the reservation apparatus 100, transmits the document to the image processing apparatus 150, and transmits charging information received from the image processing apparatus 150 to the charging management infrastructure 170.

The control module 125 controls modules internal to the management apparatus 120.

The assigning module 130 assigns reservation identification information to a document received by a receiving module 144. Reservation identification information may be generated by any method that makes it possible to uniquely identify a registered document in accordance with the exemplary embodiment. For example, reservation identification information may be generated sequentially, or a hash value calculated from a document by using a hash function may be generated.

The storage module 135 stores a document, reservation identification information, and a notification destination. The document and the notification destination to be stored in this case refer to information received by the receiving module 144. The reservation identification information to be stored in this case refers to information assigned to the document by the assigning module 130. The storage module 135 may desirably store information in such a way that the document, the reservation identification information, and the notification destination are associated with each other.

The communication module 140 includes a transmitting module 142, and the receiving module 144. The communication module 140 is connected via a communication line to the communication module 110 of the reservation apparatus 100, a communication module 165 of the image processing apparatus 150, and a communication module 180 of the charging management infrastructure 170. The communication module 140 communicates with the reservation apparatus 100, the image processing apparatus 150, and the charging management infrastructure 170.

The receiving module 144 receives a document and a notification destination that are transmitted from the reservation apparatus 100.

The receiving module 144 also receives, from the image processing apparatus 150, charging information related to charging incurred for printing of a document corresponding to reservation identification information.

The transmitting module 142 transmits charging information, and a notification destination stored in the storage module 135 to the charging management infrastructure 170. The charging information in this case refers to information received by the receiving module 144 from the image processing apparatus 150. The notification destination in this case refers to information stored in the storage module 135 and corresponding to a document printed by the image processing apparatus 150.

The transmitting module 142 may be made to transmit charging information to the charging management apparatus 280 corresponding to a notification destination.

Further, the transmitting module 142 may be made to, if organization information indicative of an organization and constituting a notification destination matches predetermined organization information, transmit charging information to the charging management apparatus 280 corresponding to the organization information.

The term "organization information" as used herein refers to information contained in a notification destination and indicative of an organization. For example, assuming that the notification destination is an email address, organization information in this case refers to the portion of the email address called "domain", that is, the portion of the email address excluding an email account. More specifically, organization information refers to the string following the "@" mark. Assuming that the notification destination is an address in an SNS's messaging function, organization information in this case refers to the portion of the address excluding an SNS account.

The transmitting module 142 may be made to, if organization information constituting a notification destination does not match predetermined organization information, transmit charging information to the charging management apparatus 280 corresponding to a personalized notification destination.

The term "personalized notification destination" as used herein refers to information indicative of the operator's personal notification destination. For example, assuming that the notification destination is an email address, the personalized notification destination in this case corresponds to the full email address. Assuming that the notification destination is an address in an SNS's messaging function, the personalized notification destination in this case refers to the address itself.

With regard to the management apparatus 120, a charging instruction is issued from the charging management infrastructure 170 to a predetermined charging management apparatus 280 upon using of the image processing apparatus 150 by a user. The charging instruction may be issued every time the image processing apparatus 150 is used, or a certain number of charging instructions may be allowed to accumulate before being subsequently issued all at once. In this regard, generally, the image processing apparatus 150, and the charging management apparatus 280 of each corresponding corporation are often placed in geographically distant locations and connected to each other via the Internet. For some corporations, there are even cases where the charging management apparatus 280 is installed abroad. This means that issuing a charging instruction upon every usage of the charging management apparatus 280 leads to increased network cost. Specific examples of such situations include when a charging instruction times out due to network delays in communication with abroad and the charging instruction has to be transmitted again. Accordingly, if there is no problem from the viewpoint of charging management on the side of the corporation, it is more efficient to allow charging information to accumulate for some time, such as one week or one month, and subsequently instruct the charging management infrastructure 170 to issue charging instructions.

The assigning module 130 may be made not to assign reservation identification information, if organization information constituting a notification destination received by the transmitting module 142 does not match predetermined organization information and if no charging management apparatus 280 corresponding to a personalized notification destination has been set.

The image processing apparatus 150 includes an accepting module 155, a printing module 160, and the communication module 165. In accordance with an operator's operation, the image processing apparatus 150 prints a document registered in the management apparatus 120, and transmits charging information related to the printing to the management apparatus 120. The image processing apparatus 150 has a document printing function. The image processing apparatus 150 corresponds to, for example, a printer, or a multifunction machine having at least a printer function (the term multifunction machine as used herein refers to an image processing apparatus further having, in addition to a printer function, one or more of functions such as scanner, copier, and facsimile functions).

The accepting module 155 accepts reservation identification information in accordance with an operator's operation. The operator in this case refers to a user who is trying to print a document registered in the management apparatus 120 by use of the image processing apparatus 150 and who has previously operated the reservation apparatus 100 and received reservation identification information for the document.

For example, the accepting module 155 controls a device such as a liquid crystal display doubling as a touchscreen to thereby accept an operator's operation. The accepting module 155 may be made to accept, in addition to such an operation, a user's operation (including, for example, gaze, gesture, or voice) made with a mouse, a keyboard, a camera, a microphone, or other such device. The accepting module 155 may be made to present a message or other information to the operator. In this case, the accepting module 155 may output sound by means of a loudspeaker, or may present a message to the user through tactile sensation by use of a tactile device. Further, as described above, the accepting module 155 may be made to receive reservation identification information from the reservation apparatus 100 through short-range wireless communication. In this case, an "operator's operation" corresponds to an operation such as bringing the reservation apparatus 100 storing reservation identification information into close proximity with the image processing apparatus 150 to enable communication, or an operation for permitting transmission of the reservation identification information at that time.

The printing module 160 prints a document received by a receiving module 168.

The communication module 165 includes a transmitting module 166, and the receiving module 168. The communication module 165 is connected to the communication module 140 of the management apparatus 120 via a communication line. The communication module 165 communicates with the management apparatus 120.

The transmitting module 166 transmits reservation identification information accepted by the accepting module 155 to the management apparatus 120.

The transmitting module 166 also transmits, to the management apparatus 120, charging information related to charging incurred for printing performed by the printing module 160.

The term "charging information" as used herein refers to information indicative of charging incurred for printing performed by using reservation identification information, and includes at least a monetary amount. Charging information may also include the date/time printed (which may be year, month, day, hour, minute, second, deci-second or less, or a combination thereof), document name, the number of pages printed, and other such information.

The receiving module 168 receives, from the management apparatus 120, a document corresponding to reservation identification information. The document in this case refers to a document to be printed, which is received in reply to reservation identification information that has been transmitted by the transmitting module 166.

The charging management infrastructure 170 includes a control module 175, and the communication module 180. The charging management infrastructure 170 transmits charging information received from the management apparatus 120 to the charging management apparatus 280 corresponding to a notification destination. The charging management infrastructure 170 is capable of communicating with multiple charging management apparatuses 280, and transmits charging information received from the management apparatus 120 to the charging management apparatus 280 corresponding to each notification destination.

The control module 175 controls modules internal to the charging management infrastructure 170.

The communication module 180 includes a transmitting module 182, and a receiving module 184. The communication module 180 is connected to the communication module 140 of the management apparatus 120 via a communication line. The communication module 180 communicates with the management apparatus 120.

The receiving module 184 receives, from the management apparatus 120, charging information and a notification destination.

The transmitting module 182 transmits charging information to the charging management apparatus 280 corresponding to a notification destination received by the receiving module 184.

Figure 2:
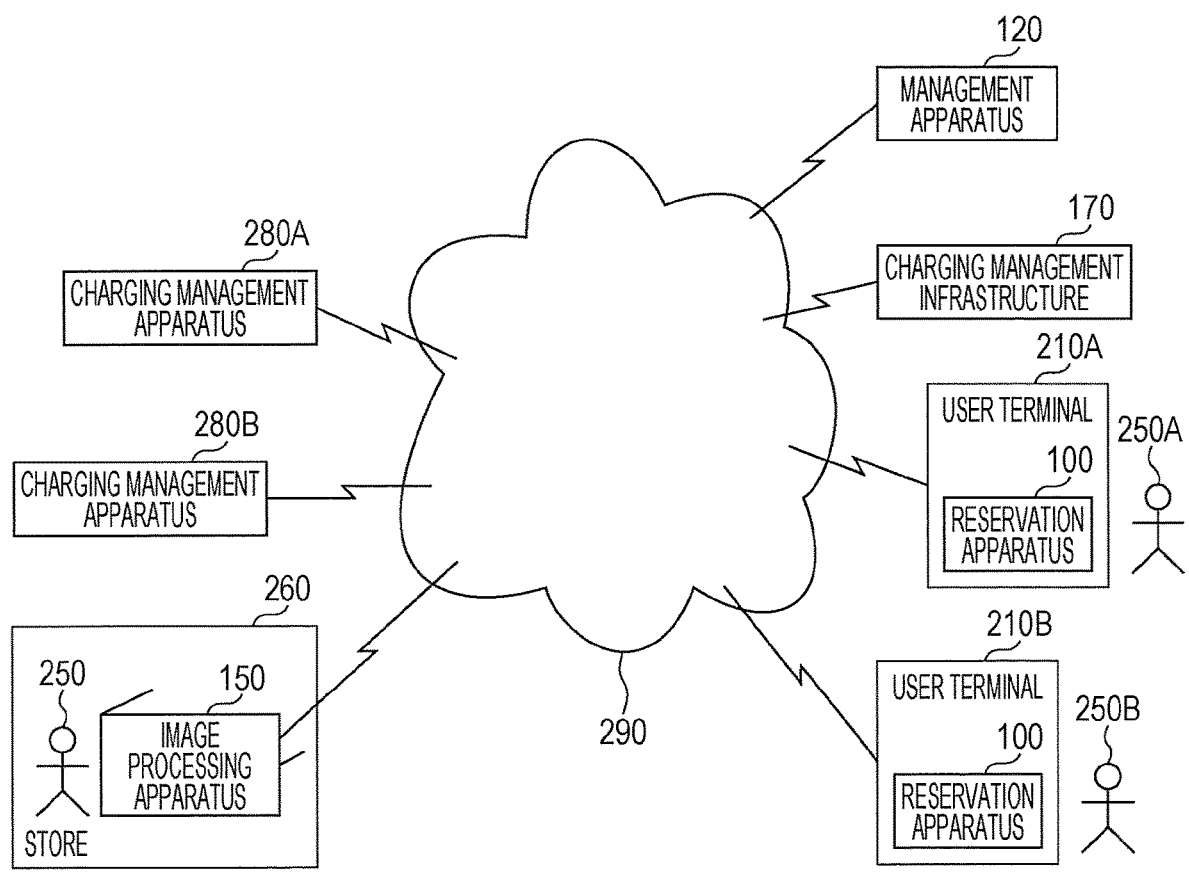
FIG. 2 illustrates an exemplary system configuration according to the exemplary embodiment.

FIG. 2 illustrates an exemplary system configuration according to the exemplary embodiment.

The reservation apparatus 100, the management apparatus 120, the charging management infrastructure 170, a user terminal 210A, a user terminal 210B, the image processing apparatus 150, which is installed in a store 260, a charging management apparatus 280A, and a charging management apparatus 280B are connected to each other via a communication line 290. The communication line 290 may be a wireless line or a wired line, or a combination thereof. For example, the communication line 290 may be the Internet, intranet, or other such network serving as a communication infrastructure.

The functions provided by the management apparatus 120, the charging management infrastructure 170, and the charging management apparatus 280 may be implemented as cloud services.

The user terminal 210A is operated by a user 250A. The user terminal 210B is operated by a user 250B. Examples of user terminals 210 include personal computers, such as notebook PCs with communication capability, and portable information communication devices (examples of which include cellular phones, smart phones, mobile devices, and wearable computers).

In the present case, the image processing apparatus 150 is installed in the store 260, and a user 250 having previously acquired reservation identification information enters the store 260 to use the image processing apparatus 150.

One recent social change is "work style reforms". As a consequence, employment styles such as having a side job or a dual job are spreading. For example, there are cases where one "works as a company employee belonging to a company during the day, and works as a small business owner in the evening (examples of small business owners may include freelancers)". In such cases, it is not possible to register, into the charging management apparatus 280 internal to an organization (examples of the charging management apparatus 280 include an accounting database of a company), a charging destination (e.g., account information for a payment service using an email account and the Internet (specific examples of which include PayPal (registered trademark)) to which expenses are charged when an employee of the organization works in the capacity of a freelancer. Accordingly, if there is any user working in such a way that the user uses an apparatus for which charging is incurred while changing the capacity in which to use the apparatus, it is not possible to switch charging destinations by means of the charging management apparatus 280 alone.

In this regard, if a person belongs to different corporations in the first place, then obviously different charging destinations exist even if the image processing apparatus 150 is used by the same person. In this case, to make clear "in which capacity a user is going to use the image processing apparatus 150", it is typically common, at the time when the user uses the image processing apparatus 150, to authenticate the user by use of an ID card or other forms of identification prepared for each individual corporation, and then charge a charging destination previously associated with each user. However, it is cumbersome if the user has to think "in which capacity I should use the image processing apparatus 150 now" every time the user uses the image processing apparatus 150. In the event that the user carelessly uses the image processing apparatus 150 in a wrong capacity, the charge is billed to a wrong destination. This necessitates settlement corrections in both corporations to which the user belongs. The above-mentioned process is thus easily prone to errors yet it takes a lot of effort to recover such errors.

The following describes a case where, in the aforementioned example, the user 250A belongs to Company A and Company B, and is trying to print a document for which the billing destination is Company A. Specifically, a case is considered where the user 250A has created a document requested by Company A, and the user 250A is now trying to print the document.

First, the user 250A registers the document into the management apparatus 120 by use of the user terminal 210A. At that time, Notification Destination A, and the document are transmitted to the management apparatus 120. The management apparatus 120 then transmits reservation identification information to Notification Destination A. Although Notification Destination A is typically the user terminal 210A used at the time of registration, Notification Destination A may not necessarily be the user terminal 210A. Notification Destination A may be another user terminal 210 as long as the user terminal 210 is used by the user 250A.

Before arriving at Company A, the user 250A enters the store 260 to print the document registered in the management apparatus 120. The user 250A enters reservation identification information to the image processing apparatus 150, and has the document printed by the image processing apparatus 150. At that time, the image processing apparatus 150 transmits, to the management apparatus 120, charging information including the monetary amount incurred in printing the document. The management apparatus 120 transmits the charging information to the charging management apparatus 280A corresponding to Notification Destination A. At the charging management apparatus 280A, accounting processes are performed by using the charging information. Example of such accounting processes include calculating expenses and, if the user 250A has paid for the printing as an out-of-pocket expense, reimbursing the user 250A for the printing charge paid.

In reserving the use of the image processing apparatus 150 with the reservation apparatus 100, it is natural for the user 250A to specify "notification destination of reservation identification information", considering the convenience at the time of actually picking up the document registered in the management apparatus 120 from the image processing apparatus 150. It is also common for the user to use different "notification destinations of reservation identification information" in accordance with the capacity in which to use the image processing apparatus 150. For example, when the user uses the image processing apparatus 150 in performing work for his or her company, the user specifies an email address given from the company (e.g., taro.fuji@ffffxxxxx.co.jp) as the notification destination, and when the user uses the image processing apparatus 150 as a small business owner, the user specifies a personal free email address (e.g., hoge@gmmmm.com) or provider email address. "Specifying and using different notification destinations of reservation identification information in accordance with the "capacity" in which to use the image processing apparatus 150" as described above, which is a mode of use that feels natural to the user 250A with no discomfort, results in specifying of the charging management apparatus 280 that is an appropriate charging destination. This reduces the risk of choosing a wrong charging management apparatus 280 in comparison to a "method in which the user makes clear the capacity in which to use the image processing apparatus 150 every time the user uses the image processing apparatus 150" as in the case of ID card authentication. Further, the user can pick up a document without authentication as long as the user has reservation identification information. Even in the event that the user specifies a wrong "notification destination of reservation identification information", a charging instruction is not issued unless printing is performed. The above-mentioned configuration thus also provides a safety net for preventing charge billing errors.

From the perspective of a corporation or other such entity that is a charging destination, it is desirable if charging for expenses incurred for the use of the image processing apparatus 150 by a user belonging to the corporation is managed by an existing charging management apparatus 280 owned by the corporation. Accordingly, for use of the exemplary embodiment by a corporation, although the corporation's domain information (e.g., @ffffxxxxx.co.jp), and information indicative of the charging management apparatus 280 to which to bill charging have to be registered into the charging management infrastructure 170 in advance, once these pieces of information are registered, then if a "notification destination of reservation identification information" specified by the user 250 when reserving the use of the image processing apparatus 150 contains the corporation's domain information, a charging instruction issued upon usage of the image processing apparatus 150 is forwarded to the charging management apparatus 280 previously registered as the billing destination. From then on, the existing charging management system or charging process internal to the corporation may be employed as it is.

Figure 3:
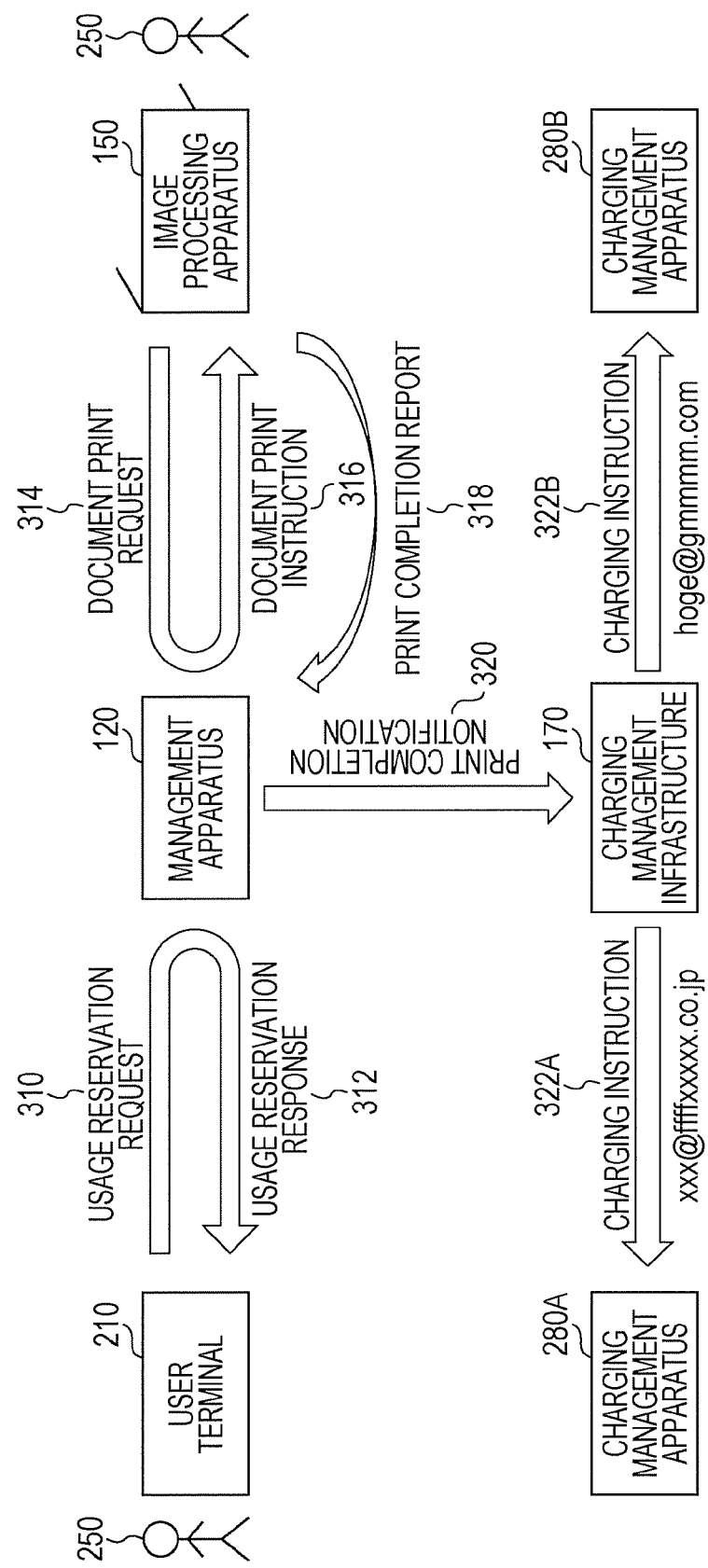
FIG. 3 is a flowchart illustrating an exemplary process according to the exemplary embodiment.

FIG. 3 is a flowchart illustrating an exemplary process according to the exemplary embodiment.

The following describes how information is passed between the user terminal 210, the management apparatus 120, the image processing apparatus 150, the charging management infrastructure 170, and the charging management apparatus 280.

With regard to a usage reservation request 310, in accordance with an operation made by the user 250, the user terminal 210 transmits a document that the user 250 wants to print, and the notification destination of reservation identification information to the management apparatus 120.

As the usage reservation request 310, for example, a usage reservation information table 400 is transmitted. FIG. 4 illustrates an exemplary data structure of the usage reservation information table 400. The usage reservation information table 400 has a Reservation Request ID field 410, a Document field 420, and a Notification Destination field 430. The Reservation Request ID field 410 stores information for uniquely identifying a reservation request (more specifically, a reservation request identification (ID)) in accordance with the exemplary embodiment. The Document field 420 stores a document. The Notification Destination field 430 stores a notification destination. FIG. 4 illustrates that, for example, for a reservation request ID: YY0001, the corresponding document is "20181119.pdf" and the corresponding notification destination is "xxx@ffffxxxxx.co.jp". In this case, it can be said that the user 250 intends to transmit charging information generated due to printing to the charging management apparatus 280A of "ffffxxxxx".

Upon receiving the usage reservation request 310, the management apparatus 120 generates reservation identification information that makes it possible to identify at least a document. For example, the management apparatus 120 generates a registration management table 500. FIG. 5 illustrates an exemplary data structure of the registration management table 500. The registration management table 500 includes a Reservation ID field 510, a Reservation Identification Information field 520, a Document field 530, and a Notification Destination field 540. The Reservation ID field 510 stores information for uniquely identifying a reservation (more specifically, a reservation ID) in accordance with the exemplary embodiment. The Reservation Identification Information field 520 stores reservation identification information. The Document field 530 stores a document to be printed. The Notification Destination field 540 stores the notification destination to which reservation identification information is transmitted in reply to the usage reservation request 310. For example, in FIG. 5, the first row of the registration management table 500 indicates that for a reservation ID: Y0001, the corresponding reservation identification information is "2PXZM40K", the corresponding document is "20181119.pdf", and the corresponding notification destination is "xxx@ffffxxxxx.co.jp", and the second row indicates that for a reservation ID: Y0002, the corresponding reservation identification information is "N51BS7D2", the corresponding document is "photo.jpg", and the corresponding notification destination is "hoge@gmmmm.com". The first row is generated for the case where the usage reservation information table 400 illustrated in the example of FIG. 4 has been received.

With regard to a usage reservation response 312, the management apparatus 120 transmits, in response to the usage reservation request 310, reservation identification information to the user 250 to whom the reservation identification information is destined. As the usage reservation response 312, for example, a usage reservation response information table 600 is transmitted. FIG. 6 illustrates an exemplary data structure of the usage reservation response information table 600. The usage reservation response information table 600 includes a Request Reply ID field 610, a Reservation Request ID field 620, and a Reservation Identification Information field 630. The Request Reply ID field 610 stores information for uniquely identifying a reply to a request (more specifically, a request reply ID) in accordance with the exemplary embodiment. The Reservation Request ID field 620 stores a reservation request ID. The Reservation Identification Information field 630 stores reservation identification information. In FIG. 6, it is indicated that, for example, for a request reply ID: YH0001, the corresponding reservation request ID is "YY0001", and the corresponding reservation identification information is "2PXZM40K".

With regard to a document print request 314, in accordance with an operation made by the user 250, the image processing apparatus 150 transmits reservation identification information to the management apparatus 120. As the document print request 314, for example, a print request information table 700 is transmitted. FIG. 7 illustrates an exemplary data structure of the print request information table 700. The print request information table 700 includes a Document Print Request ID field 710, and a Reservation Identification Information field 720. The Document Print Request ID field 710 stores information for uniquely identifying a document print request (more specifically, a document print request ID) in accordance with the exemplary embodiment. The Reservation Identification Information field 720 stores reservation identification information. In FIG. 7, it is indicated that, for example, for a document print request ID: BY0001, the corresponding reservation identification information is "2PXZM40K".

With regard to a document print instruction 316, the management apparatus 120 transmits a document to the image processing apparatus 150 in response to the document print request 314. As the document print instruction 316, for example, a print instruction information table 800 is transmitted. FIG. 8 illustrates an exemplary data structure of the print instruction information table 800. The print instruction information table 800 includes a Document Print Instruction ID field 810, a Document Print Request ID field 820, and a Document field 830. The Document Print Instruction ID field 810 stores information for uniquely identifying a document print instruction (more specifically, a document print instruction ID) in accordance with the exemplary embodiment. The Document Print Request ID field 820 stores a document print request ID. The Document field 830 stores a document. In FIG. 8, it is indicated that, for example, for a document print instruction ID: BS0001, the corresponding document print request ID is "BY0001", and the corresponding document is "20181119.pdf".

With regard to a print completion report 318, after printing of a document is completed, the image processing apparatus 150 transmits, to the management apparatus 120, information on the charge incurred for printing due to the document print instruction 316. As the print completion report 318, for example, a print completion report information table 900 is transmitted. FIG. 9 illustrates an exemplary data structure of the print completion report information table 900. The print completion report information table 900 includes a Print Report ID field 910, a Document Print Instruction ID field 920, a Date/Time Printed field 930, a Printed Document Name field 940, and a Printing Charge field 950. The Print Report ID field 910 stores information for uniquely identifying a print report (more specifically, a print report ID) in accordance with the exemplary embodiment. The Document Print Instruction ID field 920 stores a document print instruction ID. The Date/Time Printed field 930 stores the date/time of printing. The Printed Document Name field 940 stores the document name of a printed document. The Printing Charge field 950 stores the charge incurred for printing. In FIG. 9, it is indicated that, for example, for a print report ID: IF0001, the corresponding document print instruction ID is "BS0001", the corresponding date/time printed is "20181201", the corresponding printed document name is "20181119", and the corresponding printing charge is "500 yen".

With regard to a print completion notification 320, after receiving the print completion report 318, the management apparatus 120 transmits, to the charging management infrastructure 170, information on the charge incurred for printing. As the print completion notification 320, for example, a print completion information table 1000 is transmitted. FIG. 10 illustrates an exemplary data structure of the print completion information table 1000. The print completion information table 1000 includes a Print Completion ID field 1010, a Printing Charge field 1020, and a Notification Destination field 1030. The Print Completion ID field 1010 stores information for uniquely identifying completion of printing (more specifically, a print completion ID) in accordance with the exemplary embodiment. The Printing Charge field 1020 stores the charge incurred for printing. The Notification Destination field 1030 stores a notification destination. In FIG. 10, it is indicated that, for example, for a print completion ID: IK0001, the corresponding printing charge is "500 yen", and the corresponding notification destination is "xxx@ffffxxxxx.co.jp".

The charging management infrastructure 170 manages, for example, a charging domain management table 1100. FIG. 11 illustrates an exemplary data structure of the charging domain management table 1100. The charging domain management table 1100 includes a Charging ID field 1110, a Notification Destination Domain field 1120, and a Charging Management Apparatus Address field 1130. The Charging ID field 1110 stores information for uniquely identifying where charging is managed (more specifically, a charging ID) in accordance with the exemplary embodiment. The Notification Destination Domain field 1120 stores notification destination domain. The Charging Management Apparatus Address field 1130 stores the address of a charging management apparatus corresponding to the notification destination domain. That is, the charging domain management table 1100 manages the charging management apparatus 280 corresponding to a notification destination. As described above, the domain in the Notification Destination Domain field 1120 corresponds to, if an email address is set as the notification destination, the string following the "@" mark within the email address. In FIG. 11, for example, the first row of the charging domain management table 1100 indicates that for a charging ID: KK0001, the corresponding notification destination domain is "ffffxxxxx.co.jp", and the corresponding charging management apparatus address is "211.152.98.xxx", and the second row indicates that for a charging ID: KK0002, the corresponding notification destination domain is "other than above", and the corresponding charging management apparatus address is "158.211.36.xxx".

With regard to a charging instruction 322, after receiving the print completion notification 320, the charging management infrastructure 170 transmits information on the charge incurred for printing to the charging management apparatus 280 corresponding to a notification destination. At this time, the charging management apparatus 280 to which to transmit the information may be determined by using the charging domain management table 1100. For example, a domain may be extracted from a notification destination contained in the print completion notification 320, and the address of the charging management apparatus 280 corresponding to the domain may be extracted from the charging domain management table 1100. For example, if the notification destination domain is "ffffxxxxx.co.jp", this corresponds to the first row of the charging domain management table 1100. Accordingly, "211.152.98.xxx" as the address of the charging management apparatus 280 is extracted from the first row of the Charging Management Apparatus Address field 1130.

With regard to a charging instruction 322A, the charging management infrastructure 170 transmits the charge related to printing, and notification destination information to the charging management apparatus 280 corresponding to a notification destination. Alternatively, with regard to a charging instruction 322B, the charging management infrastructure 170 transmits a printing charge, and notification destination information. As the charging instruction 322A, for example, a charging information table 1200 is transmitted. FIG. 12 illustrates an exemplary data structure of the charging information table 1200. The charging information table 1200 includes a Charging Instruction ID field 1210, a Printing Charge field 1220, and a Notification Destination field 1230. The Charging Instruction ID field 1210 stores information for uniquely identifying a charging instruction (more specifically, a charging instruction ID) in accordance with the exemplary embodiment. The Printing Charge field 1220 stores the charge incurred for printing. The Notification Destination field 1230 stores a notification destination. In FIG. 12, it is indicated that, for example, for a charging instruction ID: KS0001, the corresponding printing charge is "500 yen", and the corresponding notification destination is "xxx@ffffxxxxx.co.jp".

Figure 13:
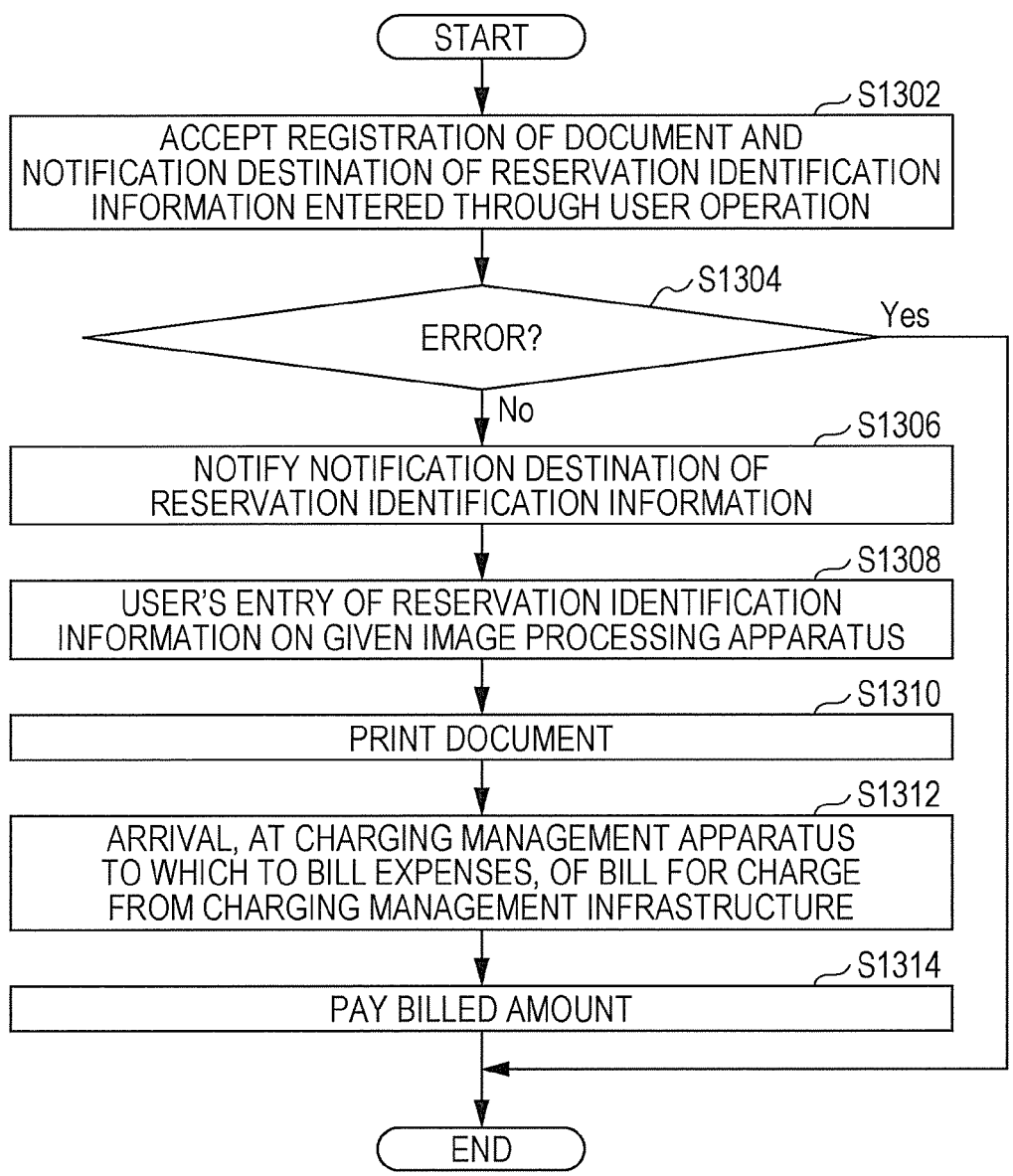
FIG. 13 is a flowchart illustrating an exemplary process according to the exemplary embodiment.

FIG. 13 is a flowchart illustrating an exemplary process according to the exemplary embodiment. The flowchart illustrates, in particular, an exemplary process related to the user 250.

The user 250 belongs to an organization where the user 250 works a second job, other than his or her regular job. During work for both the regular job and the second job, the user 250 has opportunities to have a document printed by the image processing apparatus 150 by using the management apparatus 120. To use the management apparatus 120, the user has to register in advance, into the charging management infrastructure 170, domain information that the user uses as the notification destination of reservation identification information. Not registering such domain information results in an error occurring upon specifying a notification destination. In this case, document registration fails, and thus reservation identification information is not issued.

At step S1302, the user terminal 210 accepts registration of a document, and a notification destination of reservation identification information, which are entered through operation made by the user 250.

At step S1304, the management apparatus 120 determines whether an error has occurred. If an error has occurred, the process is ended (step S1399). Otherwise, the process proceeds to step S1306. The determination of whether an error has occurred in this case may be made by determining whether the notification destination is being managed by the charging domain management table 1100. Specifically, an error may be determined to not have occurred if the notification destination exists in the Notification Destination Domain field 1120 of the charging domain management table 1100, and an error may be determined to have occurred if the notification destination does not exist in the Notification Destination Domain field 1120 of the charging domain management table 1100.

At step S1306, the management apparatus 120 notifies the notification destination of the reservation identification information.

At step S1308, the reservation identification information is entered on a given image processing apparatus 150 by the user 250.

At step S1310, the image processing apparatus 150 prints the document.

At step S1312, a bill for charge arrives, from the charging management infrastructure 170, at the charging management apparatus 280 to which to bill expenses.

At step S1314, the user 250 pays the billed amount on the image processing apparatus 150.

Figure 14:
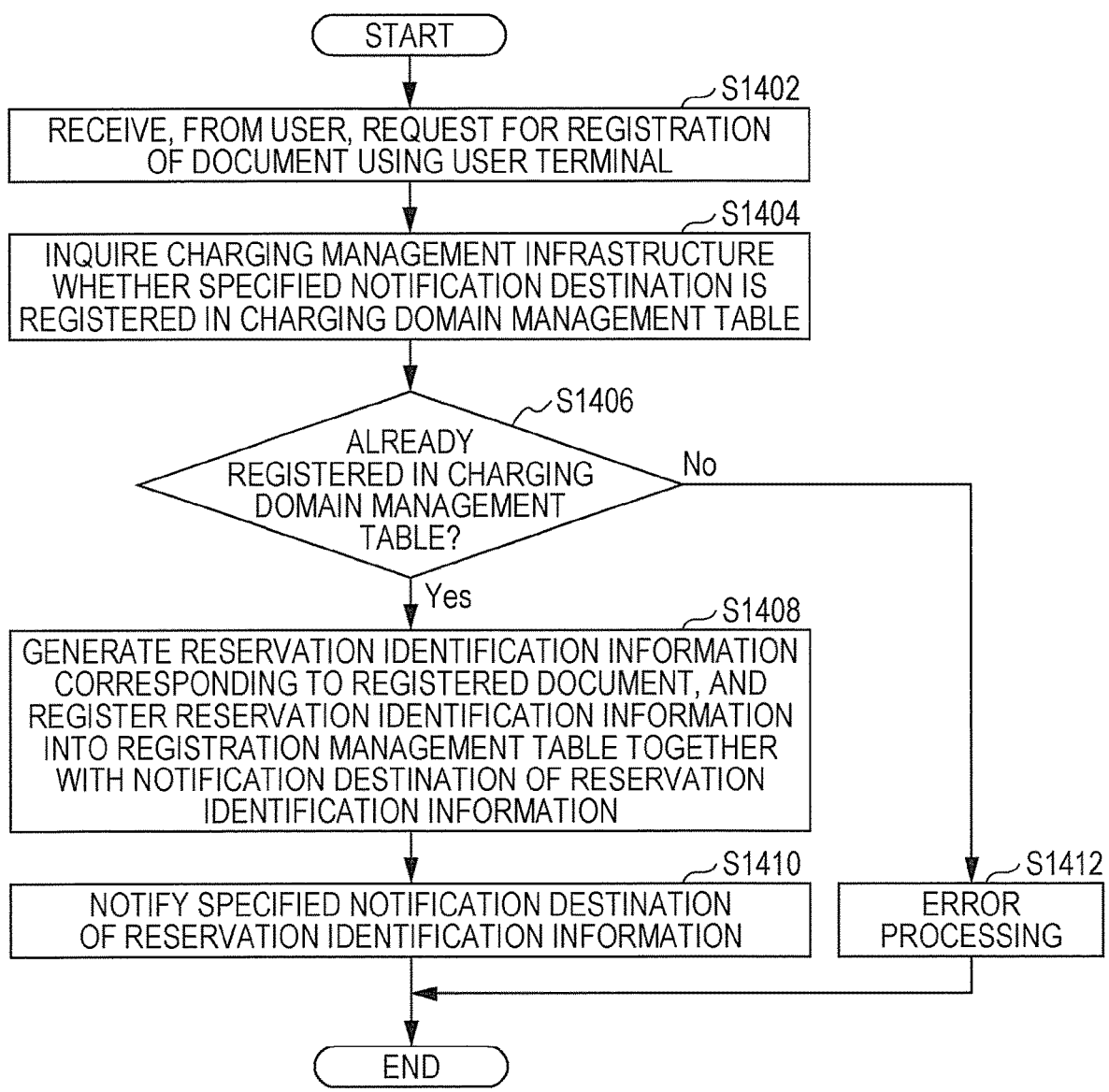
FIG. 14 is a flowchart illustrating an exemplary process according to the exemplary embodiment.

FIG. 14 is a flowchart illustrating an exemplary process according to the exemplary embodiment. The flowchart illustrates, in particular, an exemplary process performed by the management apparatus 120.

The management apparatus 120 is an apparatus to which the user 250 connects when using the image processing apparatus 150. The management apparatus 120 and the image processing apparatus 150 are in one-to-many relationship, such that a document once registered into the management apparatus 120 can be printed from any image processing apparatus 150. The process of transmitting a notification of completion of printing to the charging management infrastructure 170 is not executed unless a report indicative of completion of printing is received from the image processing apparatus 150. This is because in some cases, the user 250 cancels in mid-operation of the image processing apparatus 150.

At step S1402, a request for registration of a document using the user terminal 210 is received from the user 250.

At step S1404, an inquiry is made to the charging management infrastructure 170 as to whether a specified notification destination is registered in the charging domain management table 1100.

At step S1406, it is determined whether the specified notification destination is already registered in the charging domain management table 1100. If the specified notification destination is already registered, the process proceeds to step S1408. Otherwise, the process proceeds to step S1412. This process corresponds to step S1304 of the flowchart illustrated in the example of FIG. 13.

At step S1408, reservation identification information corresponding to the registered document is generated, and registered into the registration management table 500 together with the notification destination of the reservation identification information.

At step S1410, the specified notification destination is notified of the reservation identification information.

At step S1412, error processing is performed. Examples of error processing may include informing the user 250 that there is no charging management apparatus 280 corresponding to the specified notification destination, and inquiring the user 250 about the destination to which to provide notification.

Figure 15:
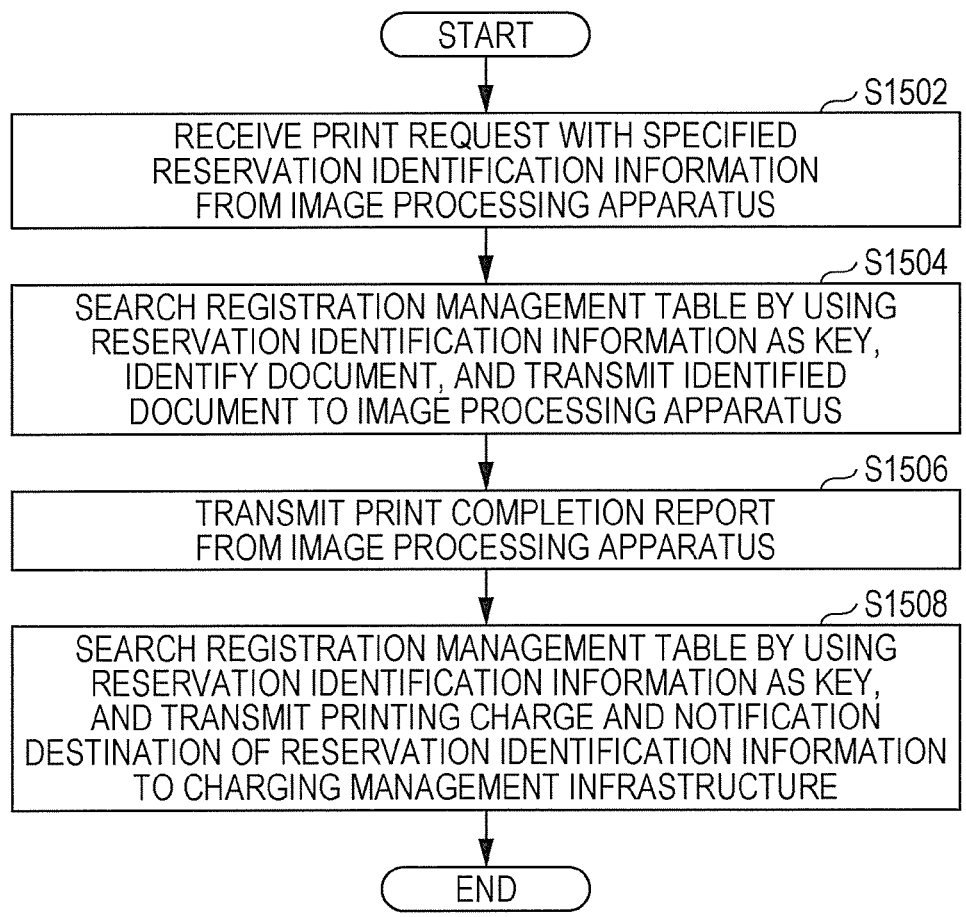
FIG. 15 is a flowchart illustrating an exemplary process according to the exemplary embodiment.

FIG. 15 is a flowchart illustrating an exemplary process according to the exemplary embodiment. The flowchart illustrates, in particular, an exemplary process performed by the management apparatus 120.

At step S1502, a print request with specified reservation identification information is received from the image processing apparatus 150.

At step S1504, the registration management table 500 is searched by using the reservation identification information as a key, a document is identified, and the identified document is transmitted to the image processing apparatus 150 that has made the print request.

At step S1506, a print completion report is received from the image processing apparatus 150.

At step S1508, the registration management table 500 is searched by using the reservation identification information as a key, and a printing charge and the notification destination of the reservation identification information are transmitted to the charging management infrastructure 170.

Figure 16:
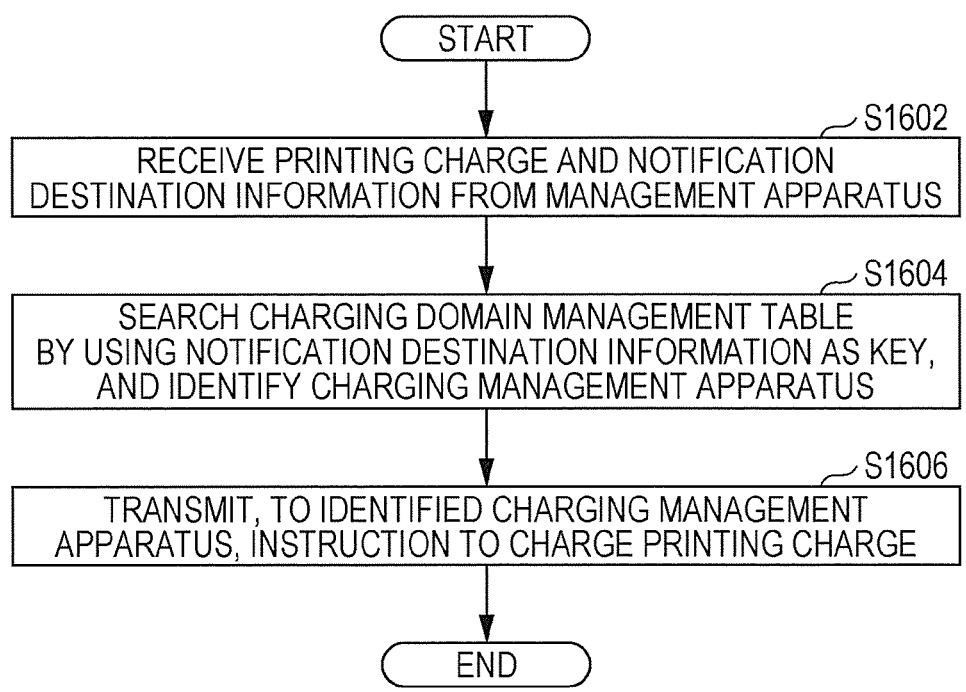
FIG. 16 is a flowchart illustrating an exemplary process according to the exemplary embodiment.

FIG. 16 is a flowchart illustrating an exemplary process according to the exemplary embodiment. The flowchart illustrates, in particular, an exemplary process performed by the charging management infrastructure 170. Upon completion of printing by the image processing apparatus 150, the charging management infrastructure 170 passes information related to the charge incurred for the printing to the charging management apparatus 280 associated with a specified notification destination domain.

At step S1602, a printing charge and a notification destination information are received from the management apparatus 120.

At step S1604, the charging domain management table 1100 is searched by using the notification destination information as a key, and the charging management apparatus 280 is identified.

At step S1606, an instruction to charge the printing charge is transmitted to the identified charging management apparatus 280.

Figure 17:
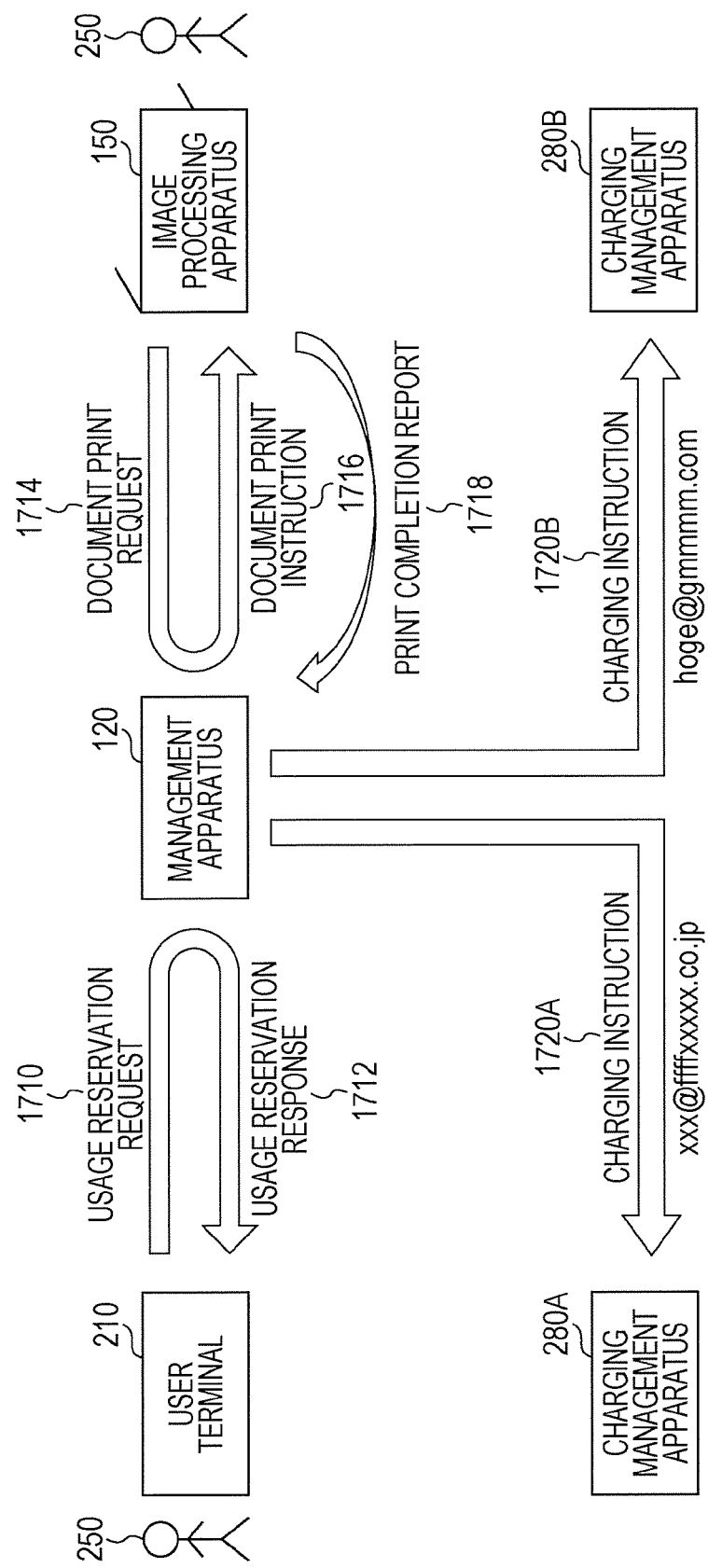
FIG. 17 is a flowchart illustrating an exemplary process according to the exemplary embodiment.

FIG. 17 illustrates an exemplary process according to the exemplary embodiment.

FIG. 17 depicts an exemplary process for a case where the functions of the charging management infrastructure 170 are incorporated as the functions of the management apparatus 120. Specifically, the modules internal to the charging management infrastructure 170 are incorporated into the management apparatus 120. It is to be noted that communications between the management apparatus 120 and the charging management infrastructure 170 in this case is accomplished simply by passing information within the management apparatus 120. Portions of the process equivalent to those of the exemplary process illustrated in FIG. 3 will be described based on the exemplary process illustrated in FIG. 3 to avoid repetitive description.

A usage reservation request 1710 is equivalent to the usage reservation request 310 illustrated in the example of FIG. 3.

A usage reservation response 1712 is equivalent to the usage reservation response 312 illustrated in the example of FIG. 3.

A document print request 1714 is equivalent to the document print request 314 illustrated in the example of FIG. 3.

A document print instruction 1716 is equivalent to the document print instruction 316 illustrated in the example of FIG. 3.

A print completion report 1718 is equivalent to the print completion report 318 illustrated in the example of FIG. 3.

A charging instruction 1720A is equivalent to the charging instruction 322A illustrated in the example of FIG. 3.

A charging instruction 1720B is equivalent to the charging instruction 322B illustrated in the example of FIG. 3.

The management apparatus 120 performs the print completion notification 320 illustrated in the example of FIG. 3 as an internal process.

Figure 18:
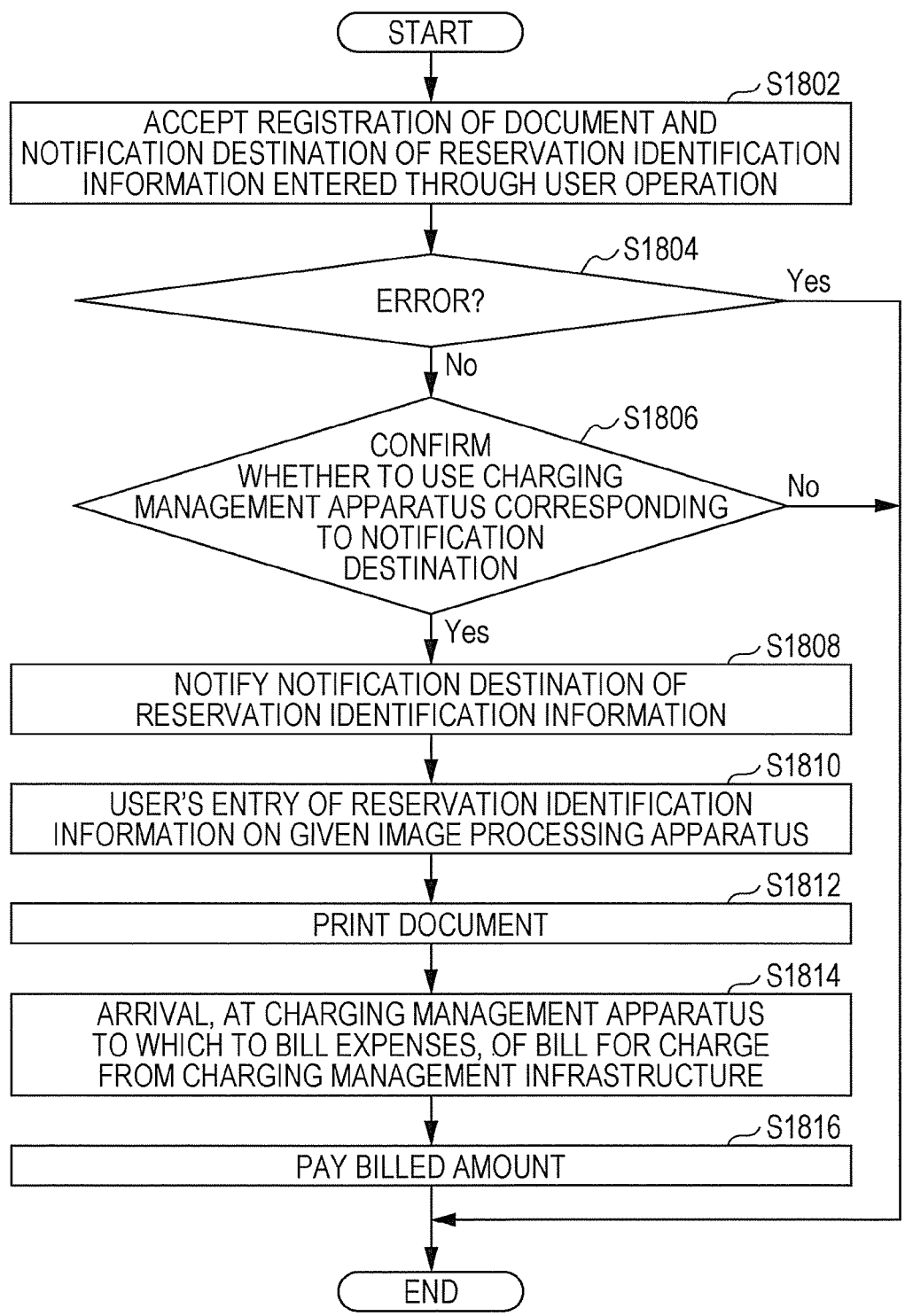
FIG. 18 is a flowchart illustrating an exemplary process according to the exemplary embodiment.
Figure 19:
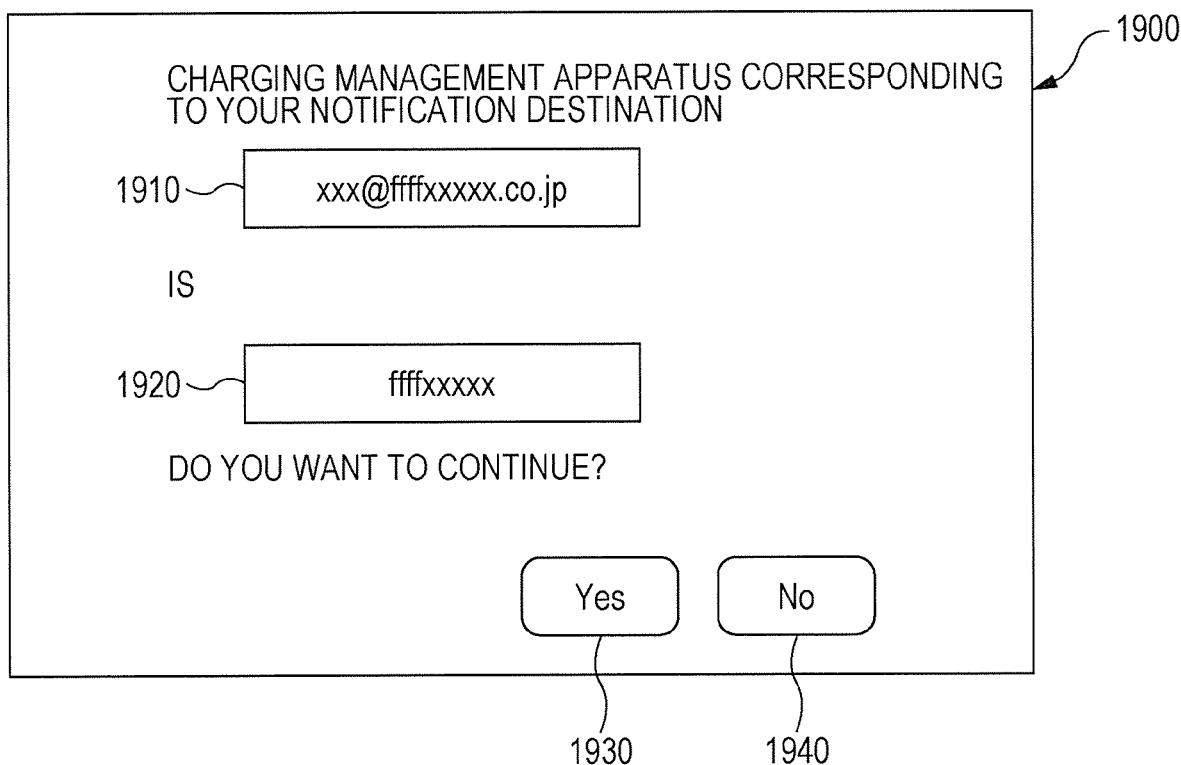
FIG. 19 is a flowchart illustrating an exemplary process according to the exemplary embodiment.
Figure 20:
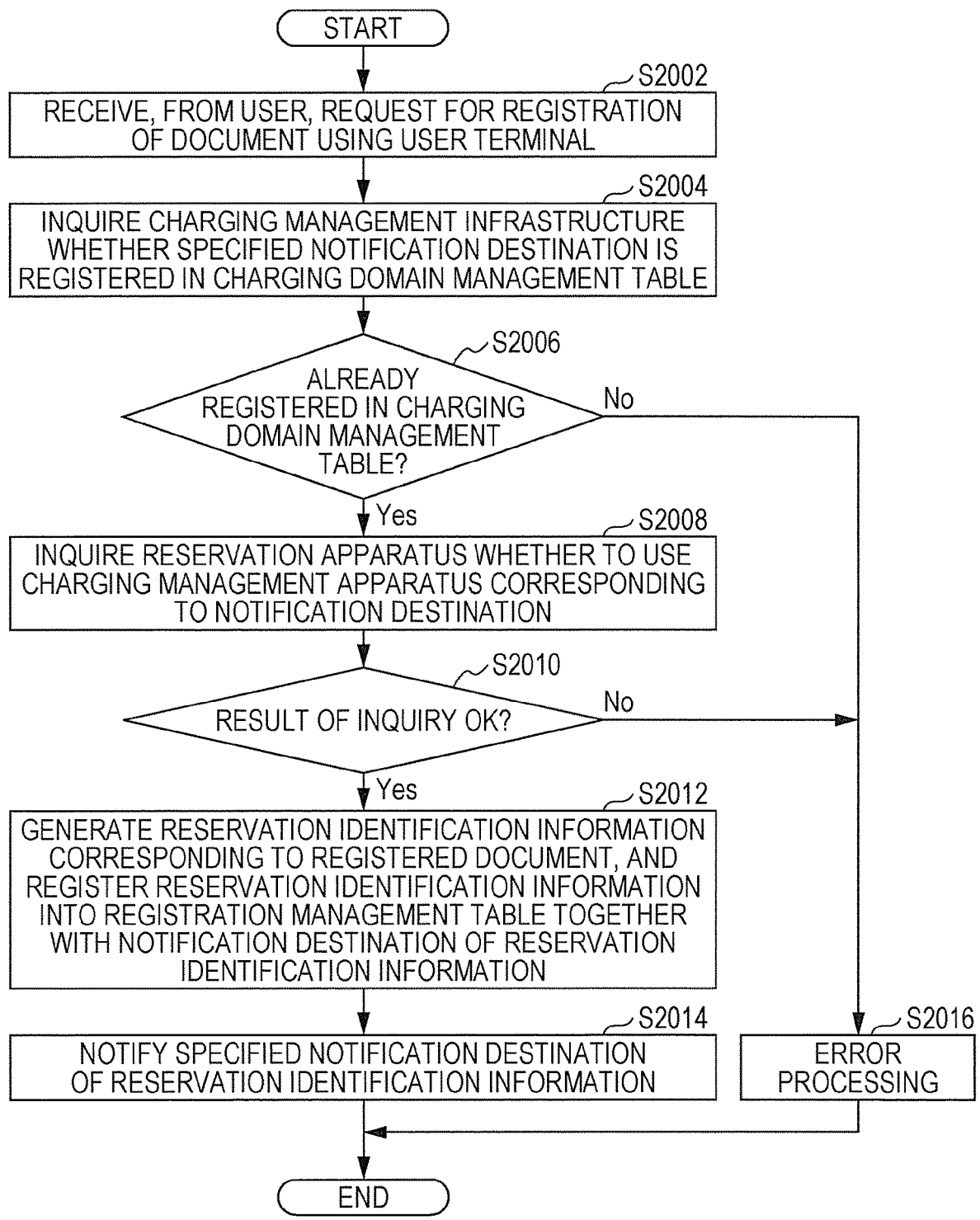
FIG. 20 is a flowchart illustrating an exemplary process according to the exemplary embodiment.

The following describes, with reference to examples illustrated in FIGS. 18 to 20, an exemplary user interface process that "confirms with the user whether to transmit charging information to the charging management apparatus 280 corresponding to a notification destination".

FIG. 18 is a flowchart illustrating an exemplary process according to the exemplary embodiment. The flowchart illustrates, in particular, an exemplary process related to the user 250.

At step S1802, registration of a document, and a notification destination of reservation identification information, which are entered through operation made by the user 250, are accepted.

At step S1804, it is determined whether an error has occurred. If an error has occurred, the process is ended (step S1899). Otherwise, the process proceeds to step S1806.

At step S1806, it is confirmed whether the charging management apparatus 280 corresponding to the notification destination may be used. If so, the process proceeds to step S1808. Otherwise, the process is ended (step S1899).

For example, a screen illustrated in FIG. 19 is displayed for confirmation by the user 250. FIG. 19 illustrates an exemplary process according to the exemplary embodiment. A screen 1900 displays a notification destination display area 1910, a charging management apparatus display area 1920, a Yes button 1930, and a No button 1940. The notification destination display area 1910 displays a notification destination accepted at step S1802. The charging management apparatus display area 1920 displays the charging management apparatus 280 corresponding to the notification destination. The user 250 is thus able to check the charging management apparatus 280 to which charging information will be transmitted. At that time, the user 250 is also able to check the notification destination for which the charging management apparatus 280 is being determined.

For example, "xxx@ffffxxxxx.co.jp" is displayed in the notification destination display area 1910, and "ffffxxxxx" is displayed in the charging management apparatus display area 1920. Thus, the screen 1900 as a whole displays the following information: "The charging management apparatus corresponding to your notification destination "xxx@ffffxxxxx.co.jp" is "ffffxxxxx". Do you want to continue?", together with the Yes button 1930 and the No button 1940. If the Yes button 1930 is selected by the user 250, the process proceeds to step S1808, and if the No button 1940 is selected, the process is ended. Alternatively, the process may return to step S1802.

At step S1808, the notification destination is notified of the reservation identification information.

At step S1810, the reservation identification information is entered on a given image processing apparatus 150 by the user 250.

At step S1812, the document is printed.

At step S1814, a bill for charge arrives, from the charging management infrastructure 170, at the charging management apparatus 280 to which to bill expenses.

At step S1816, the billed amount is paid.

FIG. 20 is a flowchart illustrating an exemplary process according to the exemplary embodiment. The flowchart illustrates, in particular, an exemplary process performed by the management apparatus 120.

At step S2002, a request for registration of a document using the user terminal 210 is received from the user 250. At step S2004, an inquiry is made to the charging management infrastructure 170 as to whether a specified notification destination is registered in the charging domain management table 1100.

At step S2006, it is determined whether the specified notification destination is already registered in the charging domain management table 1100. If the specified notification destination is already registered, the process proceeds to step S2008. Otherwise, the process proceeds to step S2016.

At step S2008, an inquiry is made to the reservation apparatus 100 as to whether the charging management apparatus 280 corresponding to the notification destination may be used. Specifically, the management apparatus 120 generates the screen 1900 described above with reference to the example of FIG. 19, and transmits the screen 1900 to the reservation apparatus 100.

At step S2010, it is determined whether the result of the inquiry is OK. If OK, the process proceeds to step S2012. Otherwise, the process proceeds to step S2016. In the case of the example illustrated in FIG. 19, if the Yes button 1930 is selected by the user 250, the process proceeds to step S2012, and if the No button 1940 is selected, the process proceeds to step S2016.

At step S2012, reservation identification information corresponding to the registered document is generated, and registered into the registration management table 500 together with the notification destination of the reservation identification information.

At step S2014, the specified notification destination is notified of the reservation identification information.

At step S2016, error processing is performed.

Figure 21:
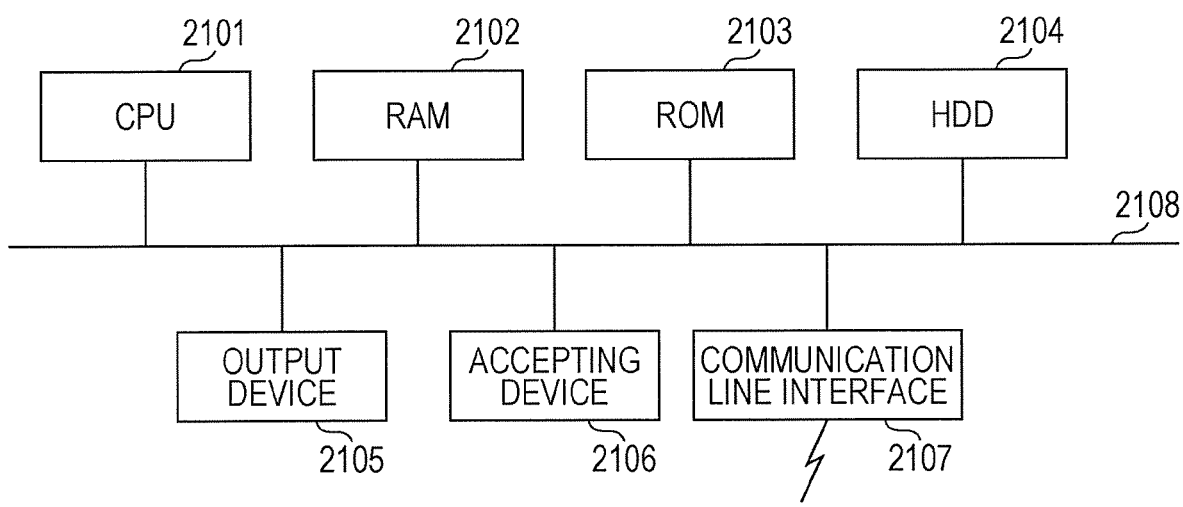
FIG. 21 is a block diagram illustrating an exemplary hardware configuration of a computer for implementing the exemplary embodiment.

The hardware configurations of the reservation apparatus 100, the management apparatus 120, and the charging management infrastructure 170, on each of which a program according to the exemplary embodiment is executed, are each implemented as a general computer as illustrated in FIG. 21, specifically, for example, a personal computer, or a computer that can serve as a server. That is, as a specific example, a central processing unit (CPU) 2101 is used as a processing unit (computing unit), and a random access memory (RAM) 2102, a read only memory (ROM) 2103, and a hard disk drive (HDD) 2104 are used as memories. The computer includes the following components: the CPU 2101 that executes a program for implementing modules such as the control module 105, the communication module 110, the transmitting module 112, the receiving module 114, the control module 125, the assigning module 130, the communication module 140, the transmitting module 142, the receiving module 144, the control module 175, the communication module 180, the transmitting module 182, and the receiving module 184; the RAM 2102 that stores the program or other data; the ROM 2103 in which a program for booting the computer or other data is stored; the HDD 2104 in which a hard disk (other than a hard disk, a solid state drive (SSD) as a flash memory may be also used) is built in and which drives the hard disk to function as the storage module 135; an accepting device 2106 that accepts data based on user's operations (including, for example, actions, voice, or gaze) made with a keyboard, a mouse, a touch screen, a microphone, a camera (examples of which include a gaze detection camera), or other devices; an output device 2105 such as a CRT, a liquid crystal display, or a loudspeaker; a communication line interface 2107 for establishing a connection with a communication network, such as a network interface card; and a bus 2108 that interconnects the above-mentioned components to exchange data. Multiple such computers may be connected to each other via a network.

An exemplary hardware configuration of the image processing apparatus 150 according to the exemplary embodiment will be described below with reference to FIG. 22. The configuration illustrated in FIG. 22 is implemented by, for example, a personal computer, and represents an exemplary hardware configuration including a data reading unit 2217, such as a scanner, and a data output unit 2218, such as a printer.

A CPU 2201 is a controller that executes a process according to a computer program describing a sequence for executing various modules described above with reference to the above-mentioned embodiment, that is, the accepting module 155, the printing module 160, the communication module 165, the transmitting module 166, and the receiving module 168.

A ROM 2202 stores programs, operation parameters, and other information used by the CPU 2201. A RAM 2203 stores programs used for execution by the CPU 2201, parameters that change as appropriate during the execution, and other information. These components are interconnected by a host bus 2204 implemented by a CPU bus or other such bus.

The host bus 2204 is connected to an external bus 2206 such as a peripheral component interconnect/interface (PCI) bus, via a bridge 2205.

A keyboard 2208, and a pointing device 2209 such as a mouse are input devices operated by the operator. A display 2210 may be a liquid crystal display device, a cathode ray tube (CRT), or other such device. The display 2210 displays various information as text or image information. Alternatively, a touch screen or other such device that includes the functions of both the pointing device 2209 and the display 2210 may be used. In that case, a physically connected keyboard such as the keyboard 2208 may not be used in implementing the keyboard function. The keyboard function may instead be implemented by drawing a keyboard (so-called software keyboard, which is also called screen keyboard) on a screen (e.g., a touch screen) by means of software.

An HDD 2211 is used to record or reproduce programs or other information executed by the CPU 2201. The HDD 2211 stores operational data accepted by the accepting module 155, data received by the receiving module 168, an image to be printed by the printing module 160, and other information. The HDD 2211 further stores information such as other various data and various computer programs.

A drive 2212 reads out data or a program stored on a removable storage medium 2213 loaded therein, such as a magnetic disk, an optical disc, a magneto-optical disc, or a semiconductor memory. The drive 2212 then supplies the data or program to the RAM 2203 connected to the drive 2212 via an interface 2207, the external bus 2206, the bridge 2205, and the host bus 2204. The removable storage medium 2213 may be also used as a data storage area.

A connection port 2214 is a port for connecting an externally connected apparatus 2215, and includes a connection unit such as a universal serial bus (USB) or IEEE1394. The connection port 2214 is connected to the CPU 2201 or other units via the interface 2207, the external bus 2206, the bridge 2205, the host bus 2204, or other components. A communication unit 2216 is connected to a communication line, and executes communication of data with an external apparatus or device. The data reading unit 2217 is, for example, a scanner, and executes reading of a document. The data output unit 2218 is, for example, a printer, and executes output of document data.

For features based on a computer program in the above-mentioned exemplary embodiment, a system having the above-mentioned hardware configuration is caused to read a computer program, which is a piece of software, such that the exemplary embodiment is implemented by cooperation of software and hardware resources.

The hardware configuration depicted in each of FIGS. 21 and 22 is only illustrative of one exemplary configuration. The exemplary embodiment is not limited to the hardware configuration illustrated in each of FIGS. 21 and 22 but may employ any configuration that enables execution of the modules described above with reference to the exemplary embodiment. For example, some modules may be implemented by dedicated hardware (e.g., an integrated circuit intended for specific applications (specific examples of which include an application-specific integrated circuit (ASIC)) or a reconfigurable integrated circuit (specific examples of which include a field-programmable gate array (FPGA)), or some modules may be located within an external system and connected via a communication line. Further, a plurality of the systems illustrated in each of FIGS. 21 and 22 may be connected to each another by a communication line so as to operate in cooperation with each other. The exemplary embodiment may be incorporated into, other than personal computers, apparatuses or devices such as portable information communication devices, information home electrical appliances, robots, copiers, facsimiles, scanners, printers, or multifunction machines.

The program described herein may be provided in the form of being stored on a storage medium, or the program may be provided by means of communication. In that case, for example, the above-mentioned program may be interpreted as an exemplary embodiment of a "computer readable storage medium storing a program".

A "computer readable storage medium storing a program" refers to a computer readable storage medium on which a program is stored and which is used for purposes such as installing, executing, and distributing the program.

Examples of such storage media include digital versatile discs (DVDs), such as "DVD-R, DVD-RW, DVD-RAM, and other types of DVDs", which are standards developed by the DVD Forum, and "DVD+R, DVD+RW, and other types of DVDs", which are standards developed by the DVD+RW alliance, compact discs (CDs) such as read-only memory (CD-ROM), CD-Recordable (CD-R), and CD-Rewritable (CD-RW) discs, Blu-ray (registered trademark) discs, magneto-optical discs (MOs), flexible disks (FDs), magnetic tapes, hard disks, read-only memories (ROMs), electrically erasable programmable read-only memories (EEPROMs (registered trademark)), flash memories, random access memories (RAMs), and Secure Digital (SD) memory cards.

The above-mentioned program or a portion thereof may be stored on the above-mentioned storage medium for purposes such as saving and distribution. Alternatively, the program may be transmitted by communication, for example, via a transmission medium such as a wired network or a wireless communication network which is used for a local area network (LAN), a metropolitan area network (MAN), a wide area network (WAN), the Internet, an intranet, an extranet, or other networks, or a combination thereof, or may be carried on a carrier wave.

Further, the program mentioned above may constitute a portion or the entirety of another program, or may be stored on a storage medium together with a different program. Alternatively, the program may be divided and stored on multiple storage media. Further, the program may be stored in any form, such as compressed or encrypted, as long as the program is capable of being restored.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A management apparatus comprising:
a first receiving unit that receives a document and a notification destination that are transmitted from a reservation apparatus;
an assigning unit that assigns reservation identification information to the document received by the first receiving unit;
a memory that stores the document, the reservation identification information, and the notification destination;
a second receiving unit that receives charging information from an image processing apparatus, the charging information being information related to charging incurred for printing of a document corresponding to the reservation identification information; and
a first transmitting unit that transmits, to a charging management infrastructure, the charging information, and the notification destination stored in the memory.

2. A management apparatus comprising:
a first receiving unit that receives a document and a notification destination that are transmitted from a reservation apparatus,
an assigning unit that assigns reservation identification information to the document received by the first receiving unit;
a memory that stores the document, the reservation identification information, and the notification destination;
a second receiving unit that receives charging information from an image processing apparatus, the charging information being information related to charging incurred for printing of a document corresponding to the reservation identification information; and a second transmitting unit that transmits the charging information to a charging management apparatus corresponding to the notification destination.

3. The management apparatus according to claim 2, wherein if organization information matches predetermined organization information, the second transmitting unit transmits the charging information to a charging management apparatus corresponding to the organization information, the organization information being information indicative of an organization and constituting the notification destination.

4. The management apparatus according to claim 2, wherein if organization information does not match predetermined organization information, the second transmitting unit transmits the charging information to a charging management apparatus corresponding to a personalized notification destination, the organization information being information indicative of an organization and constituting the notification destination.

5. The management apparatus according to claim 3, wherein if the organization information does not match the predetermined organization information, the second transmitting unit transmits the charging information to a charging management apparatus corresponding to a personalized notification destination, the organization information being information indicative of an organization and constituting the notification destination.

6. The management apparatus according to claim 1, wherein the assigning unit does not assign the reservation identification information if organization information does not match predetermined organization information and if a charging management apparatus corresponding to a personalized notification destination has not been set, the organization information being information indicative of an organization and constituting the notification destination.

7. The management apparatus according to claim 2, wherein the assigning unit does not assign the reservation identification information if organization information does not match predetermined organization information and if a charging management apparatus corresponding to a personalized notification destination has not been set, the organization information being information indicative of an organization and constituting the notification destination.

8. A non-transitory computer readable medium storing a program causing a computer to execute a process for management, the process comprising:
- receiving a document and a notification destination that are transmitted from a reservation apparatus;
- assigning reservation identification information to the received document;
- storing the document, the reservation identification information, and the notification destination;
- receiving charging information from an image processing apparatus, the charging information being information related to charging incurred for printing of a document corresponding to the reservation identification information; and
- transmitting, to a charging management infrastructure, the charging information, and the stored notification destination.

* * * * *